United States Patent Office 2,834,752
Patented May 13, 1958

2,834,752

STABILIZING SYNTHETIC RUBBERS

Arnold R. Davis, Riverside, and Frank A. V. Sullivan, Darien, Conn., assignors to American Cyanamid Company, New York, N. Y., a corporation of Maine No Drawing. Application January 27, 1954
Serial No. 406,596

4 Claims. (Cl. 260—45.95)

This case relates to the manufacture of synthetic rubbers. In particular, it is concerned with treatment of polymer and copolymer types of synthetic rubbers prior to compounding into vulcanizable compositions to stabilize them against further polymerization, cyclization or cross-linkage and gel formation during drying and storage. As such it is a continuation-in-part of application for United States Letters Patent Serial No. 106,737, filed July 25, 1949, of Arnold R. Davis and Frank A. V. Sullivan, the applicants herein, now abandoned.

One of the difficulties encountered in the manfacture of synthetic rubber-like polymers and copolymers is their lack of stability to gel formation caused by further polymerization, cyclization, cross-linkage and the like. After polymerization and coagulation, by whatever method or combination of methods may be used, the product usually must be dried. Ordinarily, too, it is stored for a considerable period before its final utilization. During the drying and storage periods, it is often found that cross-linkages develop and gel forms in the rubber. Also, cross-linkages and gel often develop during subsequent mechanical processing, i. e., mastication, and the like. These phenomena are objectionable in that they alter the properties of the product.

In the past, attempts have been made to prevent such changes in the product during drying, storage, mastication, etc. by the addition to the latex, prior to compounding into a vulcanizable rubber composition, of any of various materials which exert a stabilizing effect. Unfortunately, of the materials available, none is sufficiently effective in accomplishing the desired result without at the same time discoloring the product. For example, various substituted amines and other chemicals have been utilized. One of the most commonly used, and probably one of the best, is phenyl-beta-naphthyl amine. However, while effective as a stabilizer, it suffers from the objection that in admixture with the more common types of synthetic rubbers, it can only be used to produce a black or dark-colored product, since it discolors light-colored or white rubber products very badly when exposed to light.

There remains, then, a commercial demand for materials which effectively stabilize synthetic rubbers against cross-linkage and gel formation during drying, storage and processing. Particularly is there a demand for effective stabilizing agents suitable for use in light-colored or white rubber products which will not discolor the final product. It is, therefore, the principal object of the present invention to devise a product for, and a method of, preventing further polymerization, cyclization, cross-linkage and the like, and gel formation in synthetic rubbers of the polymer and copolymer types. It is a further object to provide a color stable, unvulcanized, sulfur vulcanizable synthetic rubber composition stabilized against gel formation.

Surprisingly enough, the objects of the present invention have been successfully met by the use of a novel group of hindered phenols. The result is particularly astonishing in view of the fact that while phenolic reactants previously have been tried for the purpose, they have not always been found to be quite adequate.

In general, a compound as used for the purpose of the present invention may be characterized as a 2,2'-methylene-bis-(4,6-dialkylphenol), capable of being represented by the formula

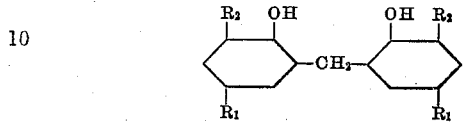

in which $R_1$ is an alkyl radical of 1–3 carbon atoms and $R_2$ is a tertiary alkyl radical of from 4 to about 8 carbon atoms, the linkage from the tertiary carbon being directly to the phenol ring.

It is a particular advantage of the compounds of the present invention that their beneficial stabilizing or gel inhibiting effect extends on into the manufacture of finished products as well as providing exceptional stability during drying and storage prior to compounding. Acting as a stabilizer, these new compounds are also effective during mastication and other processing operations. In addition, they have the exceptionally valuable and independent property of functioning as antioxidants to prevent ageing through deterioration by oxygen of vulcanized rubber products.

The fact that the stabilizers of this invention also function so successfully in overcoming ageing through oxidation of rubber, whether natural or synthetic, in a vulcanized rubber composition, is quite surprising. This is so inasmuch as it is recognized in the art that there is no necessary correlation between the cross-linkage and the like reaction occurring in unvulcanized synthetic rubbers and the oxidation reaction, whether occurring in the unvulcanized state or in a vulcanized rubber composition. Sulfur vulcanizable synthetic rubbers such as the butadiene polymers, butadiene-styrene copolymers, etc. are unsaturated and subject to oxidation in the unvulcanized state somewhat like unvulcanized natural rubber. Synthetic rubbers, however, are also subject to changes in structure by further polymerization, cyclization, cross-linking and the like which result in formation of an insoluble fraction (gel).

The polymerization, cyclization or cross-linkage reaction is known to take place in the absence of oxygen particularly under the influence of heat (Rubber Chemistry and Technology, vol. 25, No. 1, pp. 33–35). A trace of oxygen may catalyze the cross linking reaction but large amounts reduce the net rate (Ind. and Eng. Chemistry, August 1945, pp. 770–775). This reaction is opposed to the oxidation reaction which can lead to plasticization of unvulcanized polymers. In fact the polymerization, cyclization or cross linking reaction may go faster than any oxidation reaction so that under some conditions a hard insoluble and unusable unvulcanized polymer may result (India Rubber World, vol. 108, 1943, pp. 45–51).

Just as it is recognized that there is no necessary correlation between the two types of reactions, it is also recognized that there is no necessary correlation between the utility of any particular material as a gel inhibitor in unvulcanized synthetic rubbers during drying, storage and use and as an antioxidant for preventing ageing of rubber in vulcanize rubber compositions. Various materials have been found which stabilize synthetic rubber in varying degrees during manufacture and storage thereof prior to compounding into a vulcanizable rubber composition. Some of these have also been found to function as antioxidants in vulcanized rubber compositions while others are ineffective in this capacity.

It is extremely difficult, therefore, to attempt to predict with any degree of success whether (1) an effective stabilizer will or will not be an effective antioxidant, and vice versa; and (2) whether an ineffective stabilizer will or will not be an ineffective antioxidant, and vice versa.

Treatment of vulcanizable and vulcanized rubber compositions with a specified amount of a material as set forth above for the purpose of reducing the normal rate of ageing, through oxidation, of vulcanized rubber compositions forms the subject matter of United States Patent No. 2,538,355 to Davis and Sullivan, the applicants herein.

It is a further advantage of the present invention that the stabilizers thereof may be simply and economcially prepared from readily-available materials. In general, this is accomplished by reacting suitable alkylated cresols with formaldehyde and isolating the products. The latter are substantially colorless crystalline solids.

In most cases, suitable alkylated cresols are commerically available, methods for their preparation being known. Where it is desirable or necessary to do so, they may be readily prepared by alkylating a suitable cresol by standard methods. By way of illustration, for example, 4-methyl-6-tertiary butyl phenol may be prepared by alkylating paracresol to introduce a tertiary butyl group in the 2-position. This may be done in any of several ways. One good method is to pass isobutylene into paracresol in the presence of a catalyst such as sulfuric acid or boron fluoride etherate, or a mixture of zinc chloride and phosphoric acid. About five percent of catalyst, based on the expected weight of alkylate, should be used. Reaction is usually initially exothermic but may required mild heating to become complete. Similarly, for example, 2,4-ditertiary butylphenol may be prepared from phenol and isobutylene and 2-methyl-4-tertiary butylphenol from orthocresol and isobutylene.

In the following examples, which are given as illustrative only, preparation of several stabilizers typical of the present invention is shown.

EXAMPLE 1

*2,2'-methylene-bis-(4-methyl-6-tertiarybutylphenol)*

82 parts (0.5 mol) of 4-methyl-6-tertiarybutylphenol, 10 parts of concentrated HCl, and 0.2 part of Duponol C are charged to a 500 ml. flask, 100 parts of heptane is added, and the contents of the flask agitated while warming to 40° C. 23 parts of 36% aqueous formaldehyde solution, containing 8.25 parts (0.275 mol) of HCHO, are added dropwise so that the temperature does not exceed 60° C. The reaction mixture is digested at 50–60° C. for three hours, cooled to 20° C., and the solid product is collected on a filter. The product is slurried in 500 parts of water containing 20 parts of heptane and 0.25% of Duponol, filtered, and dried. The product weighs 73 g.; M. P., 125–128° C., yield 87%. The aqueous layer is separated from the mother liquor and discarded and 15 parts of fresh heptane is added with a fresh charge of 0.5 mol of 4-methyl-6-tertiarybutylphenol, 10 parts of concentrated HCl, and 0.2 parts of Duponol C. Processing as above, 80 parts of product is obtained; M. P., 123–125° C., yield 95%.

EXAMPLE 2

*2,2'-methylene-bis-(4-methyl-6-tertiaryoctylphenol)*

200 parts (0.91 mol) of 2-tertiaryoctyl-4-methylphenol is mixed with 10 parts of concentrated hydrochloric acid. 42 parts (0.46 mol) of 36% aqueous formaldehyde solution is added thereto and the reaction mixture heated for one hour at 55–60° C. The mixture becomes an unstirrable mass, necesstitating the addition of 250 parts of heptane as diluent, after which the mixture is stirred for an additional two hours at 55–60° C. The product is then washed with water and the heptane-water mixture is removed by azeotropic distillation. 123 parts of a substantially colorless viscous product is obtained. On recrystallization from heptane, a colorless crystalline product is obtained which has a melting point of 116–118° C.

EXAMPLE 3

*2,2'-methylene-bis-(4-ethyl-6-tertiarybutylphenol)*

356 parts (2 mols) of 2-tertiarybutyl-4-ethylphenol and 92 parts of 36% formalin solution containing 33 parts of $CH_2O$ were mixed with 2.5 parts of Duponol C and 350 parts of heptane. 42 parts of concentrated HCl was added dropwise and the mixture digested at 50–60° for 3 hours. The aqueous layer was then separated and the heptane solution of the product washed with water, caustic and water again until neutral. The solution was chilled and 158 parts of crystalline product obtained, which on recrystallization from heptane gave a product having a melting point of 123° C.

Typical of the gel-forming problems involved in the manufacture of synthetic rubbers are those found in the making of copolymers of styrene and butadiene-1,3, such as GR–S and similar types. The effectivness of the products of the present invention is clearly demonstrated in the following examples.

EXAMPLE 4

A sample of a commercial synthetic rubber latex, a butadiene-1,3 (76.5 parts) styrene (23.5 parts) copolymer made at 41° F., was divided into portions. To the first no stabilizer was added; to the seond, 1.25% of phenyl-beta-naphthylamine was added; to the third, 1.25% of 2,2'-methylene-bis-(4-methyl-6-tertiary butylphenol) was added. The portions were then coagulated by the usual salt-acid method, the solids collected, and the collected solids washed, then dried at about 190° F. The gel content was determined. The gel content was then taken after two hours of additional heating at 212° F. The results are shown in the following table.

TABLE I

| Portion | Stabilizer | Percent Gel After Drying— | |
|---|---|---|---|
| | | at 190° F. | at 190° F. +2 Hr. at 212° F. |
| 1 | None | | |
| 2 | Phenyl-beta-naphthylamine | 7.9 | 17.3 |
| 3 | 2,2'-Methylenebis(4-methyl-6-tertiarybutylphenol). | 1.3 | <1 |

It will be seen, therefore, that the stabilizer of the present invention is superior to the amine-type, not only against gel formation during drying, but during heating after drying.

EXAMPLE 5

A latex as in Example 4 is divided into four portions. To the first no stabilizer was added; to the second, 1.25% of "Wing-Stay-S," one of the commercially available more effective, non-discoloring gel inhibitors was added; to the third and fourth were added 0.4% and 1.25% respectively of 2,2'-methylene-bis-(4-methyl - 6 - tertiarybutylphenol). The portions were coagulated by the usual saltacid method and the solids collected, washed and dried at about 190° F. The gel content was determined. It was again taken after 90 minutes at about 250° F. The results are shown in Table II.

TABLE II

| Portion | Stabilizer | Amount, Percent | Percent Gel After Drying— | |
|---|---|---|---|---|
| | | | at 190° F. | at 190° F. +90 min. wt. 250° F. |
| 1 | None | | | 13.4 |
| 2 | "Wing-Stay-S" (styrene-phenol condensation product). | 1.25 | <2 | 10.1 |
| 3 | 2,2'-methylene-bis(4-methyl-6-tertiarybutylphenol). | 0.4 | 0 | <2 |
| 4 | ----do---- | 1.25 | 0 | 0 |

Table II clearly shows that the non-discoloring stabilizer according to the present invention is far superior to the commercially available non-discoloring stabilizer, even when used in amounts as little as one-third as much.

EXAMPLE 6

The procedure of Example 5 was repeated except the fourth portion was omitted and rather than heating to 250° F. after drying, the portions were stored at room temperature for 8 weeks. Results are shown in Table III.

TABLE III

| Portion | Stabilizer | Amount, Percent | Percent gel after drying +8 weeks at Room Temp. |
|---|---|---|---|
| 1 | None | | 100 |
| 2 | "Wing-Stay-S" (styrene-phenol condensation product). | 1.25 | 7.6 |
| 3 | 2,2'-Methylene-bis(4-methyl-6-tertiarybutylphenol). | 0.4 | <2.0 |

Table III shows a far greater inhibiting effect by the stabilizer of this invention as compared to the commercially available, non-discoloring, stabilizer even when used in substantially smaller amounts.

EXAMPLE 7

Example 6 was repeated except the synthetic rubber was a butadiene-1,3 (76.5 parts) styrene (23.5 parts) copolymer made at 122° F. and the stabilizer according to this invention was 2,2'-methylene-bis(4-ethyl-6-tertiarybutylphenol). The results are shown in Table IV.

TABLE IV

| Portion | Stabilizer | Amount, Percent | Percent gel after Drying— | |
|---|---|---|---|---|
| | | | at 190° | at 190° F. +8 weeks at Room Temp. |
| 1 | None | | 21.5 | 45.0 |
| 2 | "Wing-Stay-S" (styrene-phenol condensation product). | 1.25 | 18.9 | 23.4 |
| 3 | 2,2'-Methylene-bis(4-ethyl-6-tertiarybutylphenol). | 0.4 | 7.6 | 10.8 |

Again it can be seen that the stabilizer according to this invention is superior to the styrene-phenol condensation product type, although the 2,2'-methylene-bis(4-ethyl-6-tertiarybutylphenol) of this example is not quite as effective as the 2,2'-methylene-bis-(4-methyl-6-tertiarybutylphenol) of the preceding examples.

While the above examples are concerned with butadiene-styrene copolymer rubbers of a particular type, the invention is equally applicable to other similar copolymers. It is applicable generally to any situation involving a latex prepared by polymerization or copolymerization followed by coagulation. The problem of cross-linkage and gel formation exists, for example, in the manufacture of butadiene-acrylonitrile copolymers and the like. The process of this invention is equally efficient in providing effective stabilization in the manufacture of that type. It is generally applicable to any polymerization operation where the polymerization should be substantially halted and it is thereafter undesirable that further polymerization, cyclization, cross-linkage and gel formation be permitted during drying and/or subsequent heating and processing.

It is an advantage of the materials of the present invention that they are soluble in or readily compatible with the various commercial types of synthetic rubbers. They are readily incorporated by admixture with the latex just before coagulation. It is usually most convenient to do so at this point. The materials are non-toxic and produce no untoward skin irritation. They may therefore be handled freely with no special precautions.

In general, the use of from about 0.25 to about 2.5 pounds of stabilizer per 100 pounds of polymer or copolymer will be found quite adequate. In general, about 0.4–1.25 percent will be found suitable for most purposes. Where the requirements are not initially known, use of about 1.25 pounds of stabilizer per 100 pounds of finished rubber is a good average practice.

We claim:

1. A synthetic rubber composition stabilized against polymerization, cyclization, cross linkage and the formation therein of an insoluble gel fraction, consisting of an unvulcanized, sulfur vulcanizable synthetic rubber selected from the group consisting of rubber-like polymers and copolymers of butadiene-1,3 and from about 0.25% to about 2.5% by weight of said rubber of a compound of the formula

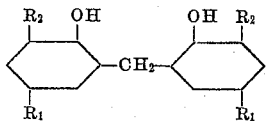

in which $R_1$ is a straight chain alkyl radical of 1–3 carbon atoms and $R_2$ is a tertiary alkyl radical of 4–8 carbon atoms, the linkage from the tertiary carbon being directly to the phenol ring.

2. A composition according to claim 1 in which the compound is 2,2'-methylene-bis-(4-methyl-6-tertiarybutylphenol).

3. A composition according to claim 1 in which the compound is 2,2'-methylene-bis-(4-ethyl-6-tertiary-butylphenol).

4. A composition according to claim 1 in which the compound is 2,2'-methylene-bis-(4-methyl-6-tertiary-octylphenol).

References Cited in the file of this patent

UNITED STATES PATENTS

| 2,538,355 | Davis et al. | Jan. 16, 1951 |
| 2,565,998 | Swaney et al. | Aug. 28, 1951 |

OTHER REFERENCES

White et al.: Ind. and Eng. Chem.; August 1945, pp. 770–775. (Copy in 260–83.7.)

Semon: Chem. and Eng. News; November 10, 1946, pp. 2900–2905. (Copy in 260–94.2.)